US007656641B2

(12) United States Patent
Mason, Jr. et al.

(10) Patent No.: US 7,656,641 B2
(45) **Date of Patent: *Feb. 2, 2010**

(54) APPARATUS AND METHOD FOR CONTROLLING A SOLENOID

(75) Inventors: Henry Hall Mason, Jr., Farmington, CT (US); Craig B. Williams, Louisville, KY (US); Cecil Rivers, Jr., Hartford, CT (US); Sohaib U. Shaikh, East Windsor, CT (US); Sean R. Dwyer, Milford, CT (US)

(73) Assignee: General Electric Company, Schenectady, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 11/614,457

(22) Filed: Dec. 21, 2006

(65) Prior Publication Data

US 2008/0151462 A1 Jun. 26, 2008

(51) Int. Cl.
*H02H 50/12* (2006.01)

(52) U.S. Cl. ....................................... 361/160; 361/161

(58) Field of Classification Search ................. 361/139, 361/140, 160, 161
See application file for complete search history.

(56) References Cited

U.S. PATENT DOCUMENTS

| | | | | |
|---|---|---|---|---|
| 3,371,252 A | | 2/1968 | James | |
| 3,406,295 A | | 10/1968 | Corey | |
| 4,449,161 A | | 5/1984 | Kling | |
| 4,642,726 A | | 2/1987 | Matsko et al. | |
| 4,810,952 A | | 3/1989 | Cohen | |
| 4,949,215 A | | 8/1990 | Studtmann et al. | |
| 5,120,143 A | * | 6/1992 | Fujiwara et al. | 400/157.2 |
| 5,268,811 A | | 12/1993 | Maeda | |
| 5,377,068 A | * | 12/1994 | Kaylor et al. | 361/154 |
| 5,442,515 A | | 8/1995 | Wallaert et al. | |
| 5,719,738 A | | 2/1998 | Singer et al. | |
| 5,894,398 A | | 4/1999 | Harris et al. | |
| 6,060,797 A | | 5/2000 | Harris et al. | |
| 6,327,130 B1 | | 12/2001 | Durif et al. | |
| 6,493,204 B1 | | 12/2002 | Glidden et al. | |
| 6,504,698 B1 | | 1/2003 | Durif et al. | |
| 2002/0056423 A1 | | 5/2002 | Yamaki et al. | |
| 2004/0075963 A1 | | 4/2004 | Liu et al. | |
| 2005/0157444 A1 | | 7/2005 | Ahrendt | |

FOREIGN PATENT DOCUMENTS

EP 0623943 A 11/1994

OTHER PUBLICATIONS

Nguyen, Danny, USPTO Office Communication for U.S. Appl. No. 11/961,608, Mail Date Mar. 18, 2009, Washington D.C.

* cited by examiner

*Primary Examiner*—Danny Nguyen
(74) *Attorney, Agent, or Firm*—GE Global Patent Operation

(57) ABSTRACT

An apparatus and method for controlling the operation of a solenoid includes a control circuit configured to receive an activation signal in response to a predetermined condition. The control circuit, in response to said activation signal, provides a first energizing signal to the solenoid for a first predetermined period, and cuts off the first energizing signal for a second predetermined period. The control circuit further provides a second energizing signal to the solenoid for a third predetermined period.

22 Claims, 7 Drawing Sheets

APPARATUS AND METHOD FOR CONTROLLING A SOLENOID

BACKGROUND OF THE INVENTION

1. Field of the Invention

The present invention relates generally to a solenoid control systems, and more specifically to an apparatus and method for controlling the operation of a solenoid.

2. Description of the Prior Art

Electromechanical solenoids provide a mechanical action in response to an electrical signal. Such electromechanical solenoids typically consist of an electromagnetically inductive coil wound around a movable ferromagnetic core or armature. The coil is configured to allow linear motion of the armature in response to an applied energizing signal in order to apply a mechanical force to some external mechanism or electromechanical device. A spring is typically provided to reset the armature to its original position when an energizing signal is removed. In a typical application, an electrical energizing signal is provided to the solenoid coil in response to a manual operation such as the operation of a pushbutton switch. In other applications, a logic device is used to provide an energizing signal to the solenoid in response to a predetermined condition. In many applications, a sensor is utilized to sense a condition of an external mechanism acted upon by the solenoid, and switches are then used to then deenergize the solenoid.

In some cases, the energizing signal to the solenoid is inadvertently maintained for an extended period, often due to a delay in the operation of the desired external mechanical operation. In other examples, a manual switch is held in the closed position and continues to provide an energizing signal after solenoid operates, or, there is an unexpected mechanical delay in the solenoid operation after the signal is provided. In such cases of maintained energizing signals, the solenoid can fail from overheating due to extended current flow.

One way to avoid failure of a solenoid due to such overheating would be to use a larger more robust solenoid device. However, this adds additional cost and requires more physical space than may be available.

Another way the problem of solenoid overheating has been addressed has been to employ a control circuit for the solenoid that is configured to shut off the energizing signal to the solenoid after a predetermined time. For example, a monostable multivibrator is used to supply an electrical signal to a solenoid upon receipt of a switching initiation signal. The duration of the output pulse is controlled to be sufficiently long enough to properly operate the solenoid without overheating in most instances. Such methods protect the solenoid but are not capable of overcoming a delay in the operation of the solenoid or the desired external mechanical operation because the solenoid energizing signal is cut off after a predetermined time period.

In view of the foregoing considerations, there is a need to provide a solenoid control circuit that protects a solenoid from overheating, and is capable of overcoming a delay in operation by automatically re-energizing the solenoid for one or more predetermined periods until the desired operation is effected.

The present invention will be apparent to those skilled in this art from the following detailed description of a preferred embodiment of the invention.

BRIEF SUMMARY OF THE INVENTION

In one aspect of the present invention, an apparatus and method for controlling the operation of a solenoid includes a control circuit configured to receive an activation signal in response to a predetermined condition. The control circuit, in response to said activation signal, provides a first energizing signal to the solenoid for a first predetermined period, and cuts off the first energizing signal for a second predetermined period. The control circuit further provides a second energizing signal to the solenoid for a third predetermined period.

In another embodiment, a method for controlling the operation of a solenoid includes sensing an activation signal indicative of a predetermined condition; providing a first energizing signal to the solenoid; cutting off the first solenoid energizing signal after a first predetermined period, for a second predetermined period; providing a second solenoid activation signal to said solenoid after said second predetermined period; and maintaining the second solenoid activation signal for a third predetermined period.

In another embodiment, a solenoid control system includes an activation signal control path in signal communication with a solenoid control unit; a solenoid circuit path in signal communication with the solenoid control unit; a power source configured to provide power to the activation signal control path and the solenoid circuit path; the solenoid control unit configured to receive an activation signal from the activation signal control path in response to a predetermined condition; wherein the solenoid control unit, in response to the activation signal, provides a first energizing signal to a solenoid included within the solenoid circuit path for a first predetermined period, and thereafter cuts off the first energizing signal for a second predetermined period; and thereafter provides a second energizing signal to the solenoid for a third predetermined period.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
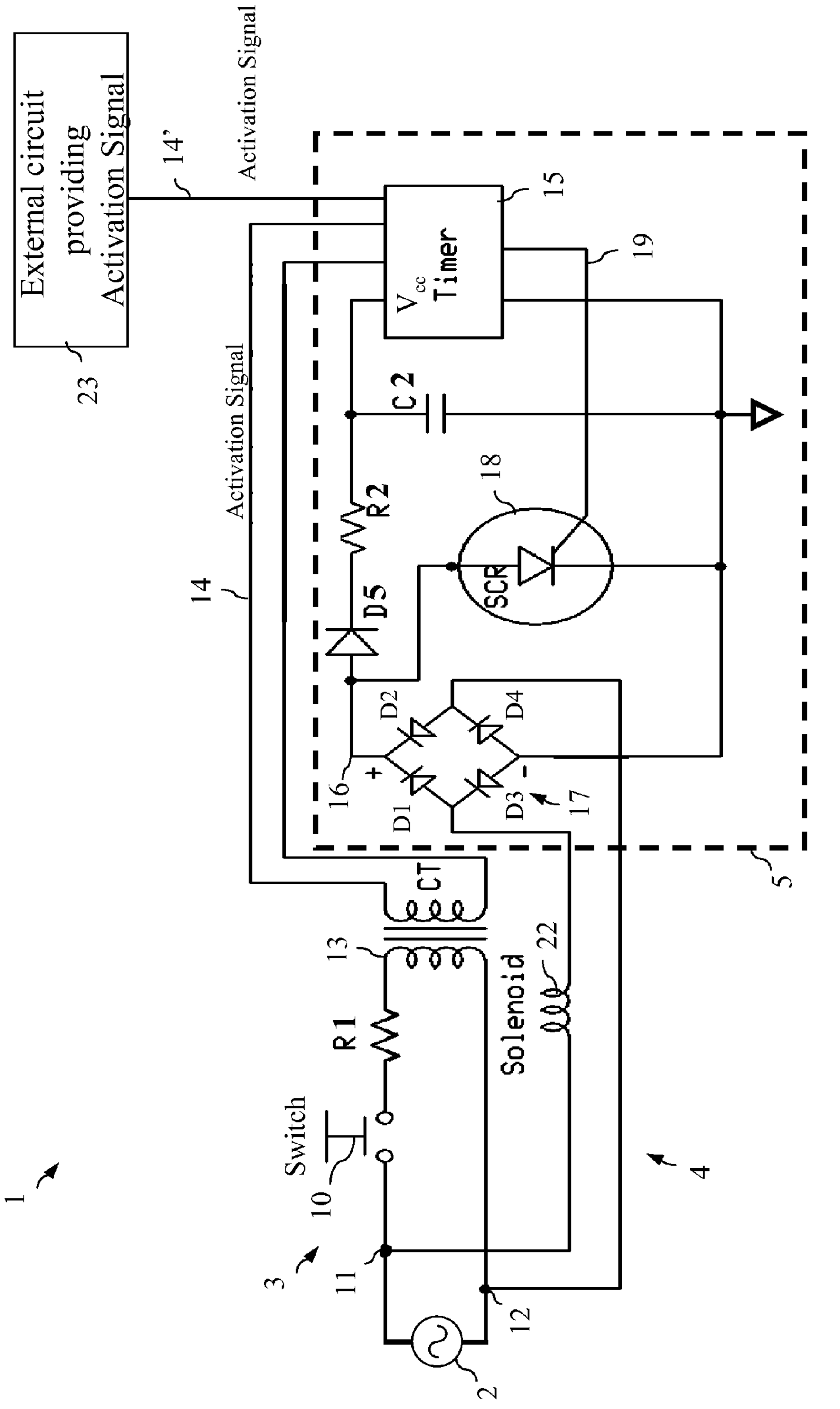
FIG. 1 depicts a schematic representation of an exemplary circuit for controlling the operation of a solenoid in accordance with an embodiment of the invention.
Figure 2:
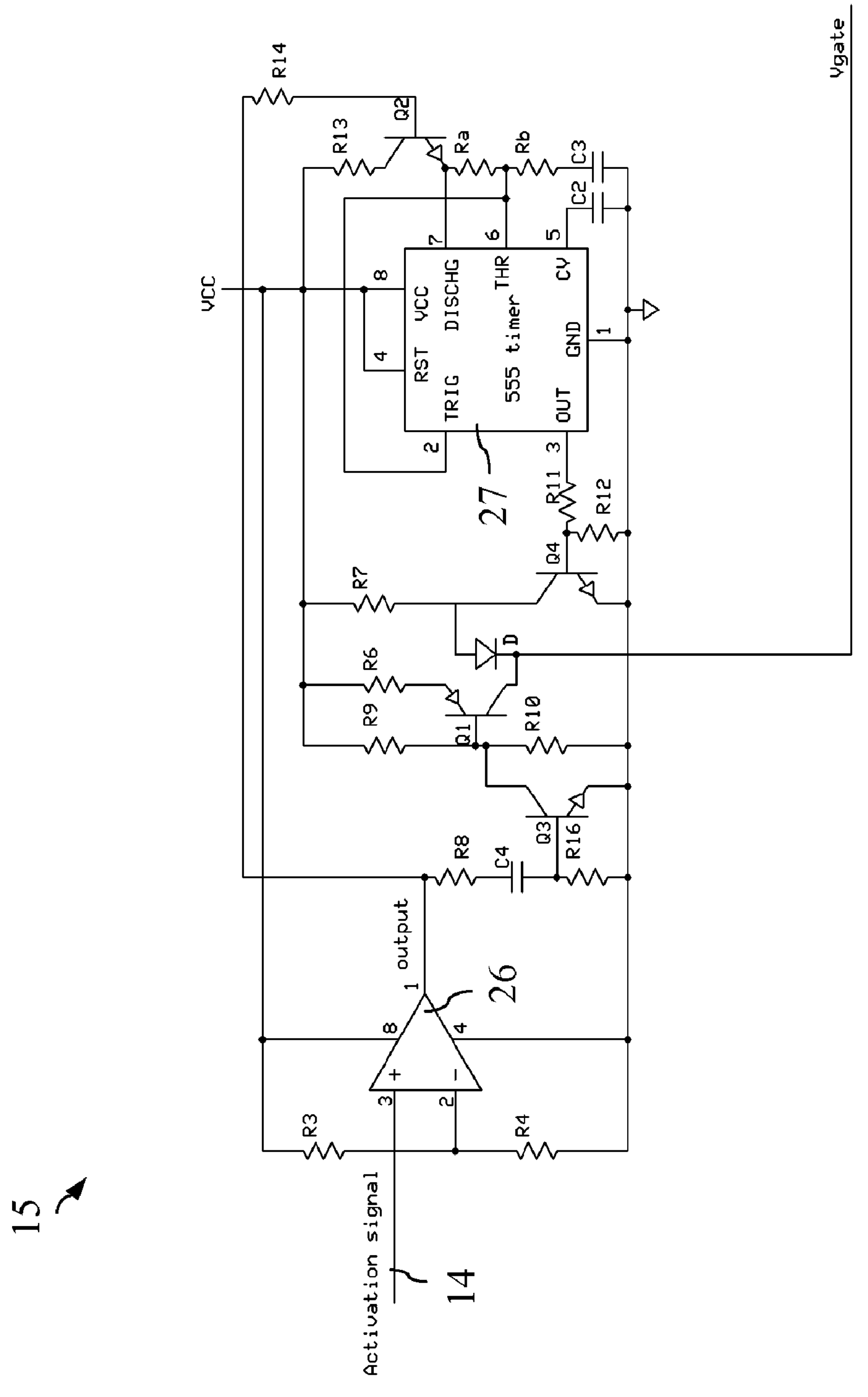
FIG. 2 depicts a schematic representation of an exemplary circuit of a timer as used in controlling the operation of a solenoid in accordance with an embodiment of the invention.
Figure 3:
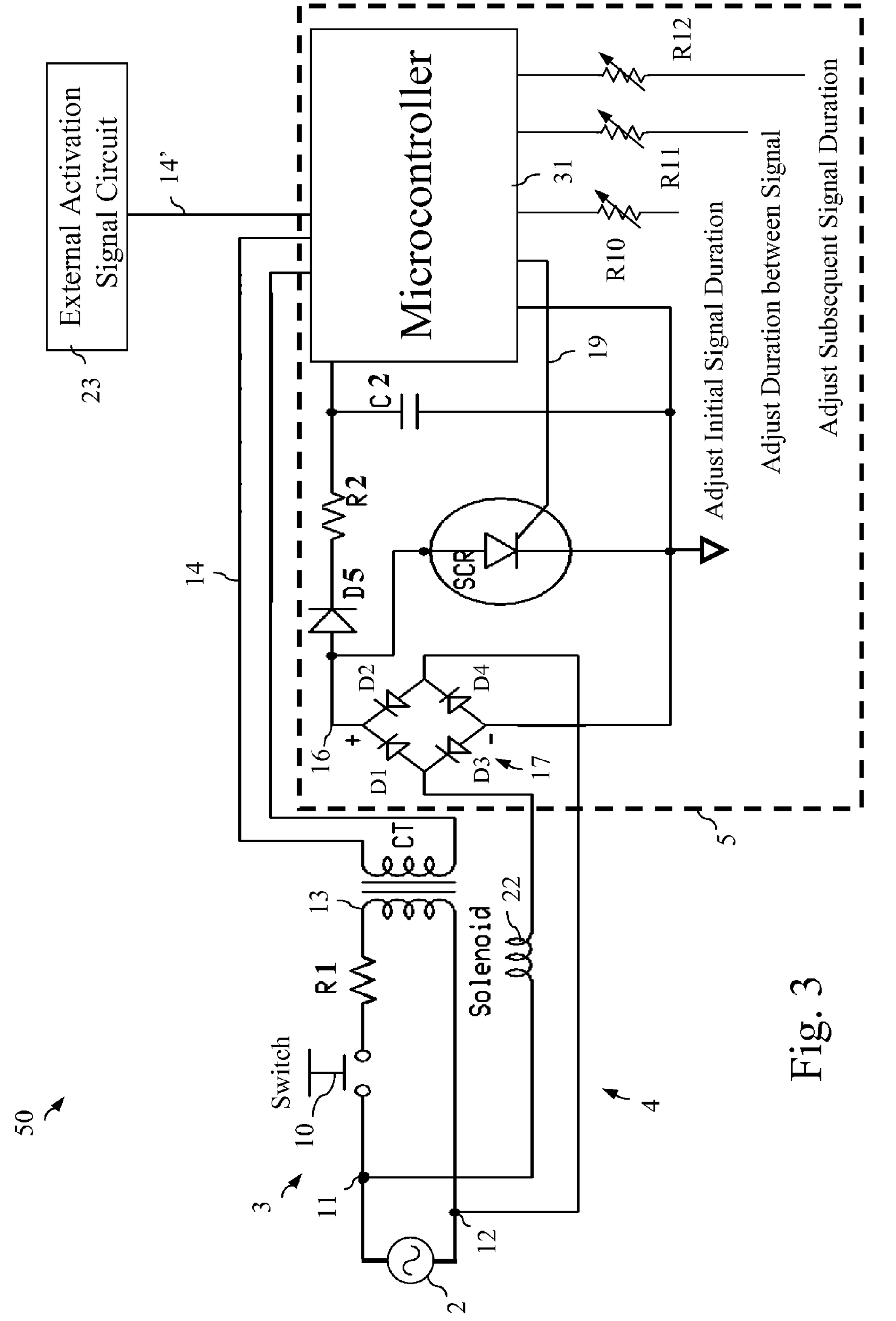
FIG. 3 depicts a schematic representation of an alternative exemplary circuit for controlling the operation of a solenoid in accordance with an embodiment of the invention using a microcontroller to perform the timing and logic functions.
Figure 7:
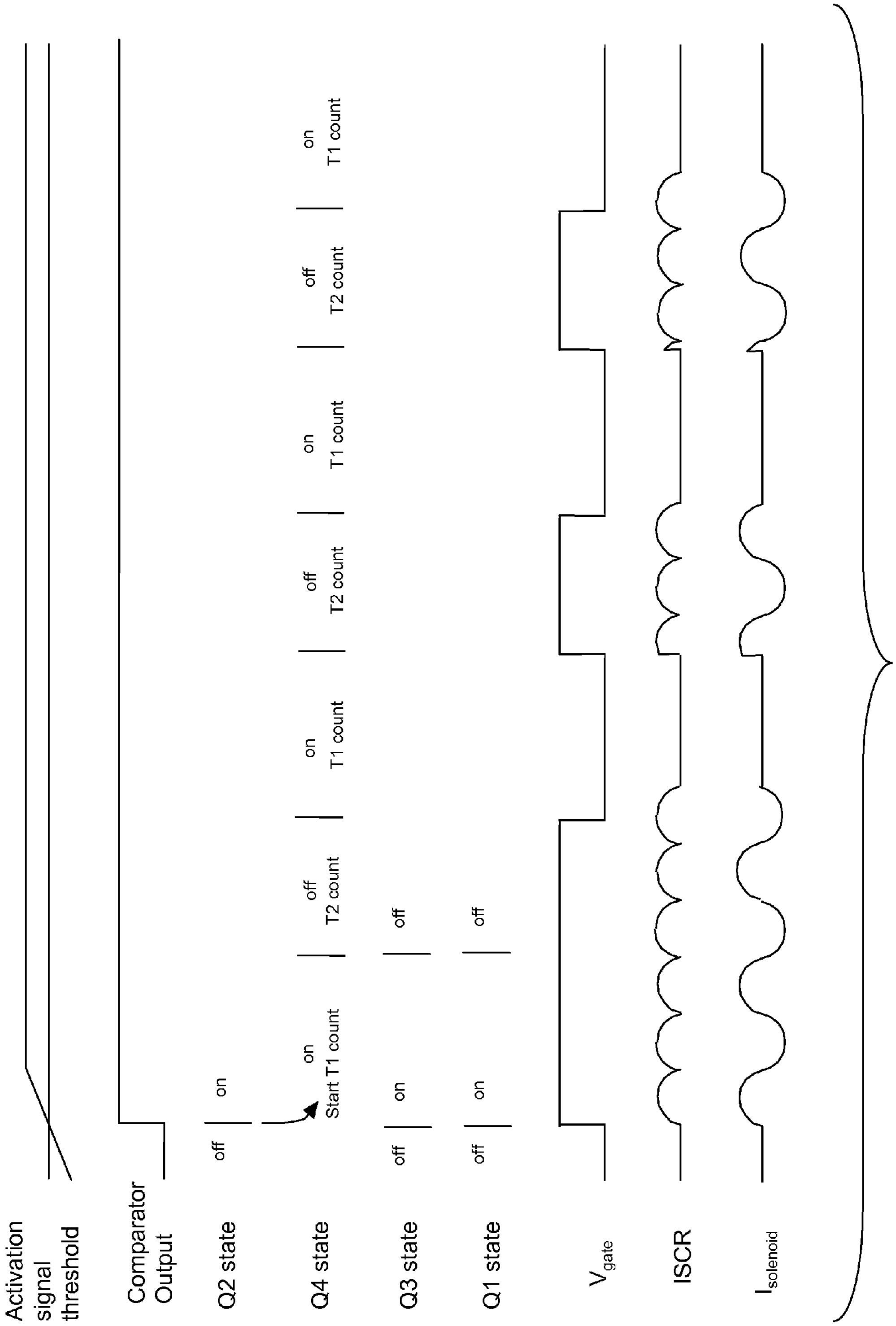
FIG. 7 depicts various waveforms associated with the circuit embodiments of FIGS. 1, 2, and 3.

A schematic of the solenoid control circuit in accordance with the present invention is generally illustrated in FIG. 1, FIG. 2, and FIG. 3. As these embodiments of the present invention are described, reference should also be made to FIG. 7 as necessary, as a depiction of various waveforms associated with the described circuits is provided.

Referring initially to FIG. 1, an exemplary solenoid control system 1 is depicted. As shown, an external AC source 2 provides power to an activation signal control path 3 and a solenoid circuit path 4. Both the activation signal control path 3 and the solenoid circuit path 4 are in signal communication with a solenoid control unit 5. As is further depicted, the solenoid control unit 5 includes a full wave bridge rectifier 17, a filtering diode D5, a current limiting resistor R2, a smoothing capacitor C2, a timer 15, and a silicon controlled rectifier (SCR) or other suitable solid state switching device 18 (e.g., MOSFET (metal oxide semiconductor field effect transistor), TRIAC (triode for alternating current) or other transistor device).

In operation of the control system 1, an AC electrical signal is provided from the external AC source 2 at terminals 11 and 12. For the first half of the cycle, the AC signal at terminal 11 is passed through a solenoid 22 (included within the solenoid circuit path 4), through diode D1 of bridge rectifier 17, and to an output terminal 16 of the full wave bridge rectifier 17. For the second half of the cycle, the AC signal at terminal 12 is passed through diode D2 of rectifier 17 to output terminal 16 of full wave bridge rectifier 17. The rectified signal at output terminal 16 is then provided to a filtering circuit comprising diode D5, series current limiting resistor R2, and smoothing capacitor C2. The signal from the filtering circuit is passed to the timer 15 in order to provide input power $V_{cc}$ thereto. The resistance value of series resistor R2 is selected to provided sufficient impedance to limit the current through solenoid 22 below its actuation current level until the timer 15 provides a solenoid energization signal, as described in more detail below.

A switch 10, such as a pushbutton, included within the activation signal control path 3 is disposed between terminal 11 and a current limiting resistor R1 (also within the activation signal control path 3). When the switch 10 is closed, an electrical signal from the AC source 2 is sent through current limiting resistor R1, and across the primary windings of a current transformer 13 included within the activation signal control path 3. An activation signal 14 is thereby induced on the secondary windings of current transformer 13, and provided to start the timer 15. It will be understood that an activation signal 14' from an external circuit 23, such as from a programmable logic controller (PLC) for example, may also be provided in lieu of, or in addition to, the timer 15.

An output energizing signal 19 from timer 15 is provided to the gate of SCR 18, thereby biasing it closed and in the conduction state. During the first half of the AC cycle, the current at the cathode of SCR 18 then flows through diode D4 of full wave bridge rectifier 17, and through the windings of solenoid 22, thus increasing current flow through the solenoid 22 sufficiently to energize the windings and to actuate a plunger (not shown) associated with the solenoid 22. For the second half of the AC cycle, the current at the cathode of SCR 18 flows through diode D3 of full wave bridge rectifier 17 and to the terminal 12. During the period the SCR 18 is in the conduction state allowing current to flow from the output terminal 16 of the rectifier 17 through the SCR 18, the capacitor C2 discharges, providing continued input signal to timer 15 for a duration depending on the chosen value of the capacitor C2.

It will be understood by those of skill in the art that various signal processing techniques (e.g., such as level conversion and filtering of the activation signal to enhance the overall circuit performance) may optionally be utilized in conjunction with the timer circuit, without departing from the scope of the invention. For example, the activation signal to timer 15 may be latched or maintained until the SCR 18 has been placed in the conduction state allowing current to flow from the output terminal 16 of the rectifier 17 through the SCR 18, diode D4 of full wave bridge rectifier 17, and through the windings of solenoid 22, thus increasing current flow through the solenoid 22 sufficiently to energize the windings and to actuate the solenoid 22 plunger. This ensures if the activation signal is noisy or not maintained for a sufficient period to enable the timer 15 to output an energization signal to the solenoid, the initial activation signal will be latched “ON” to the timer to ensure operation. This can be accomplished by using a simple flip-flop type circuit (not shown) to function as a latch. The latch (not shown) will reset when the capacitor C2 discharges.

Referring again to FIG. 1, during normal operation, the SCR 18 will remain in a conducting state until the energization signal 19 to SCR 18 gate is shut off by the timer 15. When the switch 10 is released or placed in the “open” state, the activation signal 14 to the timer 15 is shut off, resetting the timer and cutting off the energization signal 19 from the timer 15 to the gate of SCR 18 and thereby cutting current to flow from the output terminal 16 of the rectifier 17 through SCR 18, thus decreasing current flow through the windings of solenoid 22 sufficiently to deactivate or reset the solenoid 22 plunger.

However, if the activation signal 14 is maintained beyond a predetermined period, the timer 15 will cut off the energization signal 19 to the gate of SCR 18. The timer 15 will then hold the gate of SCR 18 in an “open” or non-conducting state for a predetermined period by continuing to cut off the energization signal 19 for that predetermined period.

At the end of the predetermined non-energization or delay period, if an activation signal 14 remains provided to the timer 15, the timer 15 will reset and an output energizing signal 19 from timer 15 is provided to the gate of SCR 18, thereby biasing it closed and in the conduction state allowing current to again flow from the output terminal 16 of the rectifier 17, through the SCR 18, and diode D4 of full wave bridge rectifier 17 thus increasing current flow sufficiently to energize the windings of solenoid 22 to actuate the solenoid 22 plunger.

The timer 15 circuit may be implemented using various circuit components and configurations. Having described the timer operation in a general way, a description of a particular implementation thereof will be described by way of example in FIG. 2.

Referring now to FIG. 2, a schematic of an exemplary timer circuit 15 is shown. To provide a clean input to the timer 15, the input activation signal 14 is provided to a comparator 26, with input resistors R3 and R4 values chosen to set the threshold for the output signal from comparator 26.

Under normal conditions, when no activation signal is present, and timer 27 is not triggered or in the OFF state, there is no output signal from comparator 26 to resistors R8, R16 and capacitor C4, and therefore transistor Q3 remains in a non-conducting, or OFF state. With Q3 OFF, the input voltage, $V_{cc}$ to timer 15 allows current to flow through resistors R9 and R10 such that the voltage on the base of Q1 is greater than at the emitter thereof so the PNP transistor Q1 remains in a non-conducting, or OFF state.

With no activation signal 14 present, and no output signal from comparator 26, the voltage at the base of Q2 is less than $V_{be}$, and Q2 remains in a non-conducting, or OFF state and therefore no current flows through R13, Ra, Rb, or C3 and the timer 27 does not operate.

However, the normal operation of the timer 27 is such that an output signal at Pin 3 of timer 27 will be provided to transistor Q4 until the timer 27 turns ON. The voltage divider resistors R11 and R12 provide greater than base-emitter voltage ($V_{be}$) on the base of transistor Q4, putting transistor Q4 in a conducting, or ON condition. Transistor Q4 conducts current through resistor R7, holding the voltage at R7 and diode D to $V_{ce}$, hence no current flows through diode D and the voltage signal output of timer 15, remains low, or essentially at zero volts.

When an activation signal is provided on pin 3 of the comparator 26 that is higher than the voltage on pin 2 of the comparator 26 across dividing resistors R3 and R4, an output signal from the comparator 26 is provided to R8, C4, and R16, putting Q3 in a conducting, or ON state, thus enabling current through resistor R9. This pulls the base voltage of transistor Q1 down to the $V_{ce}$ of transistor Q3 (low) and puts transistor Q1 in a conducting, or ON condition. Transistor Q1 on current flows through resistor R6 to the output of timer 15 ($V_{gate}$) providing an output energization signal from the timer 15.

Additionally, when an activation signal 14 is provided on pin 3 of the comparator 26 that is higher than the voltage on pin 2 of the comparator 26 across dividing resistors R3 and R4, an output signal from the comparator 26 is provided to resistor R14, putting transistor Q2 in a conducting, or ON condition, enabling current flow through resistors R13, Ra, Rb, capacitor C3 and triggers the timer 27 to begin the timing cycle through an input signal to Pin 2 of timer 27.

The integrated circuit timer 27 is configured as an a stable multivibrator which provides an output as a series of pulses, with an adjustable duration between the pulses. The timer 27 output "ON" and "OFF" times are adjusted by selection of the values of Resistors Ra and Rb and capacitor C3. The duration of the timer 27 "ON" time is given by:

$$T_{on}=0.693(Ra+Rb)\times C3.$$

The duration of the timer 27 "OFF" time is given by:

$$T_{off}=0.693(Rb)\times C3.$$

When timer 27 turns on, the output signal at pin 3 of timer 27 is cut off.

This effectively grounds resistor R11 and drops the voltage on the base of transistor Q4 below $V_{be}$, putting transistor Q4 in a non-conducting, or OFF state. With transistor Q4 effectively OFF, current flows from timer 15 input $V_{cc}$ through resistor R7 and diode D to continue to provide an output energization signal ($V_{gate}$) from timer 15.

During the period of timer 27 "ON" time ($T_{on}$) as calculated above based on the values of resistors Ra and Rb and capacitor C3, the voltage on the base of transistor Q3 will drop below $V_{be}$ due to the C4, R16 time constant and place transistor Q3 in a non-conducting, or OFF state. With transistor Q3 non-conducting, the voltage divider of resistors R9, R10 also places transistor Q1 in a non-conducting, or OFF state. At the end of timer 27 "ON" time ($T_{on}$), the timer 27 again provides an output signal at pin 3 of timer 27 putting transistor Q4 in a conducting, or ON condition, enabling current flow through resistor R7 to ground cutting off the output signal ($V_{gate}$) from timer 15 for a duration of "OFF" time ($T_{off}$) as calculated above based on the values of resistors Ra and Rb and capacitor C3.

At the end of timer 15 "OFF" time ($T_{off}$), the timer 27 automatically provides again the output signal at pin 3 of timer 2. This again places transistor Q4 in a non-conducting, or OFF state and current flows from timer 15 input $V_{cc}$ through resistor R7 and diode D to continue to provide an output energization signal ($V_{gate}$) from timer 15 as before.

The cycle of providing an output energization signal 19 ($V_{gate}$) from timer 15 for a predetermined period in response to an activation signal, and cutting off the output signal 19 ($V_{gate}$) from timer 15 for a predetermined duration and will repeat as long as activation signal is above the threshold and $V_{cc}$ is adequate to power the circuit.

It will be understood by those skilled in the art that the duration of the output energization signals ($V_{gate}$) and the duration of the OFF time between output energization signals, may be made adjustable in the field through the use of variable resistors and capacitors in the above described circuit.

Referring now to FIG. 3, an alternative embodiment of a solenoid control system 50 is shown that is identical to that of FIG. 1, except that the timer circuit 15 of FIG. 1 is replaced by a programmable microcontroller 31 that includes internal timers and switches. The microcontroller 31 may additionally be provided with user adjustable input signals such as through adjustable resistors (varistors) R10, R11, and R12 to enable adjustment of the duration of the initial and subsequent energizing signals and the "OFF" time between signals. It will be understood by those of skill in the art that as an alternative to varistors R10, R11, and R12, many other devices or circuits may also be used to enable a user to provide an adjustable input to the microcontroller 31 to enable adjustment of the duration of the initial and subsequent energizing signals and the "OFF" time between signals. The microcontroller 31 is programmed to respond to the received activation signal by providing an energizing signal 19 to switching device 18 (e.g., SCR) to energize the solenoid 22 for a predetermined period and cut off the energizing signal 19 to the solenoid 22 for a second predetermined period, and if the activation signal is maintained, reapply the energizing signal 19 to the solenoid for a third predetermined period. The microcontroller 31 is also programmed to cut off the energization signal 19 if the input activation signal 14 is shut off.

It will be appreciated that the logic steps used to perform the timing and switching functions for the operation of the present invention embodiments are readily programmable for execution by a microcontroller. It will be further appreciated that each defined energizing signal-OFF or energizing signal-ON period need not be identical, but may instead be programmed or adjusted as desired by the user.

Figure 4:
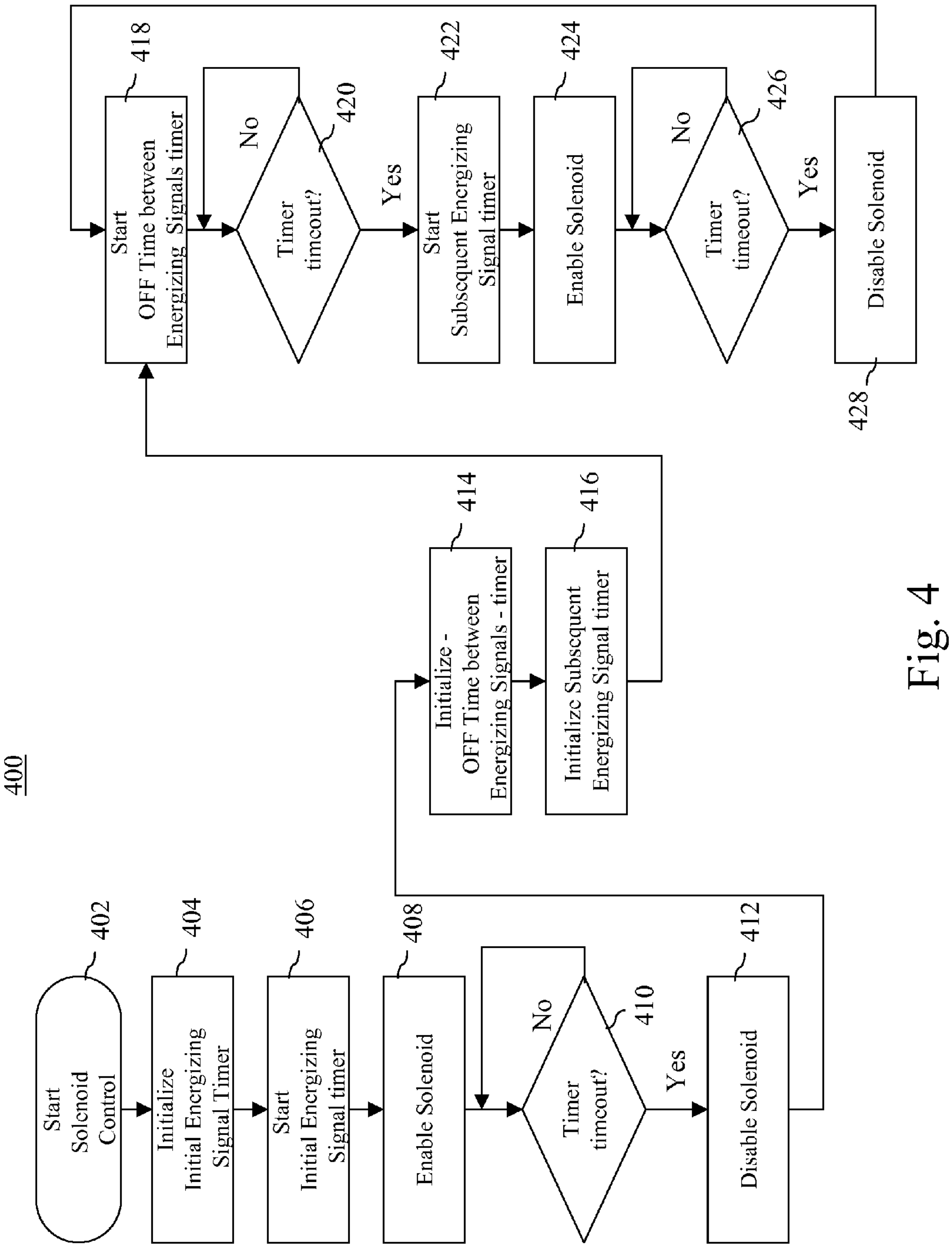
FIG. 4 depicts a logic flow for a microcontroller to perform the timing and logic functions.

Referring now to FIG. 4, a flow chart representation of an exemplary algorithm 400 as implemented by, for example, the programmable microcontroller 31 of FIG. 3 is shown. The microcontroller starts the solenoid control algorithm at block 402 when the activation signal is provided to the microcontroller. The microcontroller initializes and starts an initial energizing signal timer at blocks 404 and 406, respectively, and provides an energizing signal output to enable the solenoid as shown at block 408. The output energization signal will be maintained until the initial energizing signal timer has timed out. As shown in decision block 410, if the microcontroller initial energizing timer has timed out, the energization signal will be cut off to disable the solenoid at block 412.

The microcontroller will then initialize both an energizing signal-OFF timer at block 414 and a timer for subsequent energizing signals-ON at block 416. Next, the energizing signal-OFF timer is started at block 418 and the output energization signal is cut off until the energizing signal-OFF timer has timed out. If the microcontroller 31 energizing signal-OFF timer has timed out, as determined in decision block 420, the subsequent energizing signals-ON timer is started at block 422 and the microcontroller provides an energizing signal output to re-enable the solenoid at block 424. If the microcontroller subsequent energizing signals-ON timer has timed out, as determined at decision block 426, the energization signal will be cut off to disable the solenoid at block 428.

It will be appreciated that the microcontroller 31 may be programmed to repeat the subsequent energizing signals and signal-OFF cycles indefinitely, or until the activation signal to the microcontroller 31 is cut off.

Figure 5:
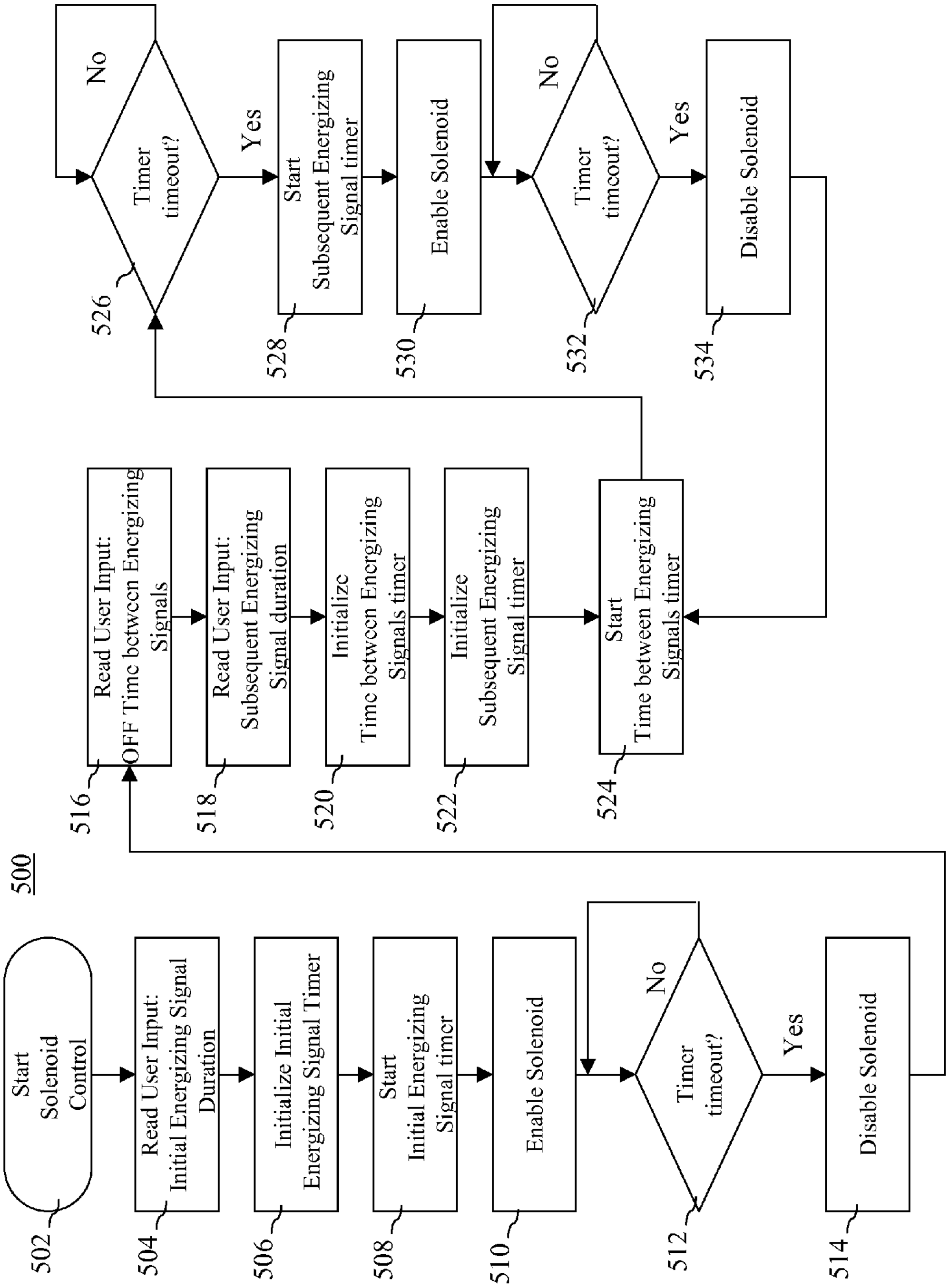
FIG. 5 depicts an alternative logic flow for a microcontroller to perform the timing and logic functions.

Referring now to FIG. 5, a flow chart representation of an exemplary algorithm 500 in which the duration of the initial and subsequent energization signals, as well as the duration of the OFF time between signals, is defined in the field at start-up (as implemented, for example, by the programmable microcontroller 31 of FIG. 3) is shown.

The microcontroller starts the solenoid control algorithm at block 502 when the activation signal is provided to the microcontroller. The microcontroller first reads the user input defining the initial energizing signal duration at block 504. Next, the microcontroller initializes and starts an initial energizing signal timer at blocks 506 and 508, respectively, and provides an energizing signal output to enable the solenoid at block 510. The output energization signal will be maintained until the initial energizing signal timer has timed out. If the initial energizing timer has timed out as reflected in decision block 512, the energization signal will be cut off to disable the solenoid at block 514.

The microcontroller will then read the user inputs defining both the duration signal-OFF periods, and the duration of the subsequent energizing signals at blocks 516 and 518, respectively. The microcontroller then initializes both an energizing signal-OFF timer (block 520) and a timer for subsequent energizing signals-ON (block 522).

Next, the energizing signal-OFF timer is started at block 524 and the output energization signal is cut off until the energizing signal-OFF timer has timed out. If the microcontroller energizing signal-OFF timer has timed out, as determined at decision block 526, the subsequent energizing signals-ON is started at block 528 and the microcontroller provides an energizing signal output to re-enable the solenoid at block 530. If the microcontroller 31 subsequent energizing signals-ON timer has timed out as reflected at decision block 532, the energization signal will be cut off to disable the solenoid at block 534.

It will be appreciated that the microcontroller may be programmed to repeat the subsequent energizing signals and energizing signal-OFF cycles either for a specific number of cycles, or indefinitely (as shown), or until the activation signal to the microcontroller is cut off.

Figure 6:
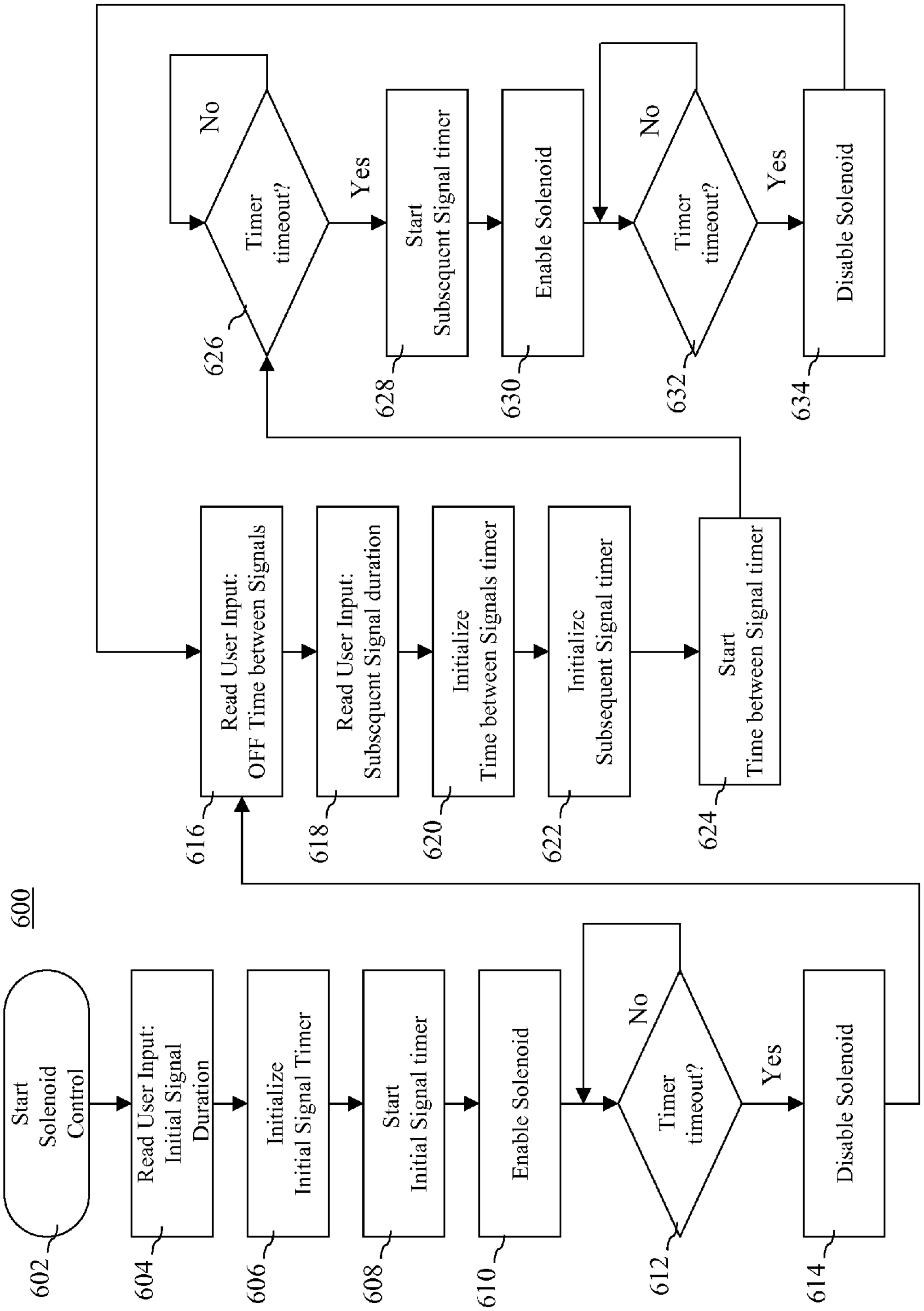
FIG. 6 depicts an alternative logic flow for a microcontroller to perform the timing and logic functions.

Referring now to FIG. 6, a flow chart representation of an exemplary algorithm 600 in which the duration of the initial and subsequent energization signals as well as the duration of the OFF time between signals is defined at any time and is adjustable while operating in the field (as implemented, for example, by the programmable microcontroller 31 of FIG. 3) is shown.

The microcontroller starts the solenoid control algorithm 600 at block 602 when the activation signal is provided to the microcontroller. The microcontroller first reads the user input defining the initial energizing signal duration at block 604. Next, the microcontroller initializes and starts an initial energizing signal timer at blocks 606 and 608, respectively, and provides an energizing signal output to enable the solenoid at block 610. The output energization signal will be maintained until the initial energizing signal timer has timed out. If the initial energizing timer has timed out as reflected at decision block 612, the energization signal will be cut off to disable the solenoid at block 614.

The microcontroller will then read the user inputs defining both the duration of the energization signal-OFF periods, and the duration of the subsequent energizing signals at blocks 616 and 618, respectively. The microcontroller then initializes both an energizing signal-OFF timer at block 620 and a timer for subsequent energizing signals-ON at block 622.

Next, the energizing signal-OFF timer is started at block 624 and the output energization signal is cut off until the energizing signal-OFF timer has timed out. If the microcontroller energizing signal-OFF timer has timed out as reflected at decision block 626, the subsequent energizing signals-ON timer is started at block 628 and the microcontroller provides an energizing signal output to re-enable the solenoid at block 630. If the microcontroller subsequent energizing signals-ON timer has timed out as reflected at block 632, the energization signal will be cut off to disable the solenoid at block.

Next, the microcontroller will return to block 616 and then re-read the user inputs defining both the duration of the energization signal-OFF periods, and the duration of the subsequent energizing signals (block 618). The microcontroller then re-initializes both an energizing signal-OFF timer and a timer for subsequent energizing signals-ON (blocks 620, 622).

It will be appreciated that the microcontroller may be programmed to repeat the subsequent energizing signal-ON and energizing signal-OFF cycles as described above either for a specific number of cycles or indefinitely, or until the activation signal to the microcontroller is cut off.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus for controlling an operation of a solenoid, the apparatus comprising:

a control circuit;

said control circuit configured to receive an activation signal in response to a predetermined condition; said predetermined condition being external to said solenoid;

wherein said control circuit is further to provide a first energizing signal to said solenoid for a first predetermined period, and to thereafter cut off said first energizing signal for a second predetermined period; and thereafter to provide a second energizing signal to said solenoid for a third predetermined period, all in response to said activation signal;

wherein said control circuit is configured to enable adjustment of the duration of the said first energizing signal, the duration of said second predetermined period, and the duration of said second energizing signal.

2. The apparatus of claim 1, wherein said control circuit is configured to enable adjustment of any of said duration periods independently of the other duration periods.

3. The apparatus of claim 1, wherein said control circuit comprises a switching device that is configured to cut off said first energizing signal for said second predetermined period; and wherein said switching device is further configured to provide said second energizing signal to said solenoid for said third predetermined period.

4. The apparatus of claim 3, wherein said switching device is one of an SCR, a MOSFET, a TRIAC, and a transistor.

5. The apparatus of claim 1, wherein said control circuit comprises:

a switching device; and a timer in electrical communication with said switching device;

wherein said timer, in response to said activation signal, is configured to trigger said switching device to provide said first energizing signal to said solenoid for said first predetermined period, and said timer is configured to shut off said switching device to cut off said first energizing signal to said solenoid for said second predetermined period, and said timer is configured to trigger said switching device to provide said second energizing signal to said solenoid for said third predetermined period.

6. The apparatus of claim 5, wherein said timer is configured to enable adjustment of the duration of said first energizing signal, the duration of said second predetermined period, and the duration of said second energizing signal.

7. The apparatus of claim 6, wherein said control circuit is configured to enable adjustment of any of said duration periods independently of the other said duration periods.

8. The apparatus of claim 1, wherein said control circuit comprises a microcontroller;

wherein said microcontroller further comprises a timer in electrical communication with a switching device;

wherein said microcontroller, in response to said activation signal, triggers said switching device to provide said first energizing signal to said solenoid for said first predetermined period, and said microcontroller shuts off said switching device to cut off said first energizing signal to said solenoid for said second predetermined period, and said microcontroller triggers said switching device to provide said second energizing signal to said solenoid for said third predetermined period.

9. The apparatus of claim 8, wherein said control circuit is configured to enable adjustment of the duration of the said first energizing signal, the duration of said second predetermined period, and the duration of said second energizing signal.

10. The apparatus of claim 9, wherein said control circuit is configured to enable adjustment of any of said duration periods independently of the other said duration periods.

11. A method for controlling an operation of a solenoid, the method comprising:

sensing an activation signal indicative of a predetermined condition; said predetermined condition being external to said solenoid;

providing a first energizing signal to said solenoid;

cutting off said first solenoid energizing signal after a first predetermined period, for a second predetermined period;

providing a second solenoid activation signal to said solenoid after said second predetermined period;

maintaining said second solenoid activation signal for a third predetermined period; and adjusting the duration of said first energizing signal, the duration of said second predetermined period, and the duration of said second energizing signal.

12. The method of claim 11, further comprising adjusting any of said duration periods independently of the other said duration periods.

13. A solenoid control system, comprising:

an activation signal control path in signal communication with a solenoid control unit;

a solenoid circuit path in signal communication with said solenoid control unit; a power source configured to provide power to said activation signal control path and said solenoid circuit path;

said solenoid control unit configured to receive an activation signal from said activation signal control path in response to a predetermined condition; said predetermined condition being external to said solenoid;

wherein said solenoid control unit is configured to provide a first energizing signal to a solenoid included within said solenoid circuit path for a first predetermined period, said solenoid control unit further configured to thereafter cut off said first energizing signal for a second predetermined period; and said solenoid control unit thereafter configured to provide a second energizing signal to said solenoid for a third predetermined period;

wherein said solenoid control unit is configured to enable adjustment of the duration of the said first energizing signal, the duration of said second predetermined period, and the duration of said second energizing signal.

14. The solenoid control system of claim 13, wherein said solenoid control unit is configured to enable adjustment of any of said duration periods independently of the other duration periods.

15. The solenoid control system of claim 13, wherein said solenoid control unit includes a switching device is configured to cut off said first energizing signal for said second predetermined period, and said switching device is further configured to provide said second energizing signal to said solenoid for said third predetermined period.

16. The solenoid control system of claim 15, wherein said switching device is one of an SCR, a MOSFET, a TRIAC, and a transistor.

17. The solenoid control system of claim 13, wherein said solenoid control unit includes a switching device;

said solenoid control unit further comprising a timer in electrical communication with said switching device;

wherein said timer, in response to said activation signal, is configured to trigger said switching device to provide said first energizing signal to said solenoid for said first predetermined period, and said timer is configured to shut off said switching device to cut off said first energizing signal to said solenoid for said second predetermined period, and said timer is configured to trigger said switching device to provide said second energizing signal to said solenoid for said third predetermined period.

18. The solenoid control system of claim 17, wherein said timer is configured to enable adjustment of the duration of said first energizing signal, the duration of said second predetermined period, and the duration of said second energizing signal.

19. The solenoid control system of claim 18, wherein said solenoid control unit is configured to enable adjustment of any of said duration periods independently of the other said duration periods.

20. The solenoid control system of claim 13, wherein said solenoid control unit includes a microcontroller;

wherein said microcontroller further comprises a timer in electrical communication with a switching device;

wherein said microcontroller, in response to said activation signal, is configured to trigger said switching device to provide said first energizing signal to said solenoid for said first predetermined period, and said microcontroller is configured to shut off said switching device to cut off said first energizing signal to said solenoid for said second predetermined period, and said microcontroller is configured to trigger said switching device to provide said second energizing signal to said solenoid for said third predetermined period.

21. The solenoid control system of claim 20, wherein said solenoid control unit is configured to enable adjustment of the duration of the said first energizing signal, the duration of said second predetermined period, and the duration of said second energizing signal.

22. The solenoid control system of claim 21, wherein said solenoid control unit is configured to enable adjustment of any of said duration periods independently of the other said duration periods.

* * * * *

UNITED STATES PATENT AND TRADEMARK OFFICE

CERTIFICATE OF CORRECTION

PATENT NO. : 7,656,641 B2
APPLICATION NO. : 11/614457
DATED : February 2, 2010
INVENTOR(S) : Mason, Jr. et al.

It is certified that error appears in the above-identified patent and that said Letters Patent is hereby corrected as shown below:

In Column 5, Line 43, delete “a stable” and insert -- astable --, therefor.

Signed and Sealed this

Sixteenth Day of March, 2010

David J. Kappos

David J. Kappos
*Director of the United States Patent and Trademark Office*